(12) United States Patent
Fontaine et al.

(10) Patent No.: US 7,428,769 B2
(45) Date of Patent: Sep. 30, 2008

(54) TIE DOWN TENSIONING DEVICE

(75) Inventors: Norston Fontaine, Minneapolis, MN (US); Paul Maire, Snowmass, CO (US)

(73) Assignee: Tie Boss LLC, Minneapolis, MN (US)

( * ) Notice: Subject to any disclaimer, the term of this patent is extended or adjusted under 35 U.S.C. 154(b) by 43 days.

(21) Appl. No.: 11/269,288

(22) Filed: Nov. 8, 2005

(65) Prior Publication Data

US 2006/0096067 A1    May 11, 2006

Related U.S. Application Data

(60) Provisional application No. 60/627,428, filed on Nov. 8, 2004.

(51) Int. Cl.
*F16G 11/00* (2006.01)
(52) U.S. Cl. .................... 24/130; 24/129 R
(58) Field of Classification Search ............ 24/115 R, 24/129 R, 130, 131 R, 129 C
See application file for complete search history.

(56) References Cited

U.S. PATENT DOCUMENTS

| | | | | |
|---|---|---|---|---|
| 322,501 | A * | 7/1885 | Taylor | 24/129 R |
| 904,843 | A * | 11/1908 | Cooper | 24/129 R |
| 1,751,762 | A * | 3/1930 | Schoenberger | 24/130 |
| 4,120,077 | A * | 10/1978 | Fink | 24/130 |
| 4,719,668 | A * | 1/1988 | Cavanagh | 24/68 F |
| 4,765,005 | A * | 8/1988 | Hippel | 5/648 |
| 4,787,660 | A * | 11/1988 | Mrazek | 24/130 |
| 4,930,193 | A | 6/1990 | Baker | |
| 5,245,729 | A * | 9/1993 | Greff | 24/129 R |
| 5,339,498 | A | 8/1994 | Parsons | |
| 5,368,281 | A | 11/1994 | Skyba | |
| 5,435,044 | A | 7/1995 | Ida | |
| 5,519,921 | A * | 5/1996 | Templer, Jr. | 24/130 |
| 5,596,791 | A * | 1/1997 | Parsons | 24/130 |
| 5,722,640 | A | 3/1998 | Skyba | |
| 5,802,679 | A * | 9/1998 | Neeley | 24/130 |
| 5,987,710 | A * | 11/1999 | Paul et al. | 24/130 |
| 5,987,711 | A * | 11/1999 | Parsons | 24/130 |
| 6,094,783 | A * | 8/2000 | Parsons | 24/130 |
| 6,163,936 | A * | 12/2000 | Benoit | 24/130 |
| 6,260,498 | B1 * | 7/2001 | Cochran | 24/130 |
| 6,269,523 | B1 * | 8/2001 | Benoit | 24/130 |
| D466,792 | S | 12/2002 | Knopp | |
| 6,662,739 | B1 | 12/2003 | Radford | |
| 6,705,179 | B1 | 3/2004 | Mohtasham | |
| 6,763,776 | B1 * | 7/2004 | Perri et al. | 24/129 R |

OTHER PUBLICATIONS

U.S. Appl. No. 29/286,580, Fontaine et al., filed May 11, 2007.
"Homax Cinchtite™ Rope Cinch" datasheet [online] Home Page. Homax Products, Inc., Bellingham, WA, 2006 (first appeared on website between the dates of Jan. 14, 2006 and Feb. 2, 2006 per Internet Archive WayBack Machine) [retrieved on Jun. 19, 2007 from the Internet:<URL:http//www.homaxproducts.com/products/tarptiedown/06/index.html>]; 1 pg.

(Continued)

*Primary Examiner*—Robert J. Sandy
*Assistant Examiner*—Ruth C Rodriguez
(74) *Attorney, Agent, or Firm*—Fredrikson & Byron, P.A.

(57) ABSTRACT

A simple and inexpensive device for a reliable tie down tensioning which device enables the tie-down to be quickly and easily applied and the flexible element tensioned and just as quickly and easily removed.

31 Claims, 4 Drawing Sheets

OTHER PUBLICATIONS

"Homax Cinchtite™ Rope Cinch" datasheet [online] Frequently Asked Questions. Homax Products, Inc., Bellingham, WA, 2006 (first appeared on website between the dates of Jan. 14, 2006 and Feb. 2, 2006 per Internet Archive WayBack Machine) [retrieved on Jun. 19, 2007 from the Internet:<URL:http//www.homaxproducts.com/products/tarptiedown/06/faqs.html>]; 2 pgs.

"Homax Cinchtite™ Rope Cinch" datasheet [online] Instructions. Homax Products, Inc., Bellingham, WA, 2006 (first appeared on website between the dates of Jan. 14, 2006 and Feb. 2, 2006 per Internet Archive WayBack Machine) [retrieved on Jun. 19, 2007 from the Internet:<URL:http//www.homaxproducts.com/products/tarptiedown/06/instructions.html>]; 1 pg.

"Homax Cinchtite™ Rope Cinch" product packaging. (Undated, see material from website cited herein), Homax Products, Inc., Bellingham, WA, 2 pgs.

"Rope Ratchet" datasheet [online] listing U.S. Patents 5,368,281 and 5,722,640. Carolina North, Mfg., Kernersville, NC [retrieved on Jun. 19, 2007 from the Internet:<URL:http://www.roperatchet.com/roeratchets.shtml>]; 1 page.

* cited by examiner

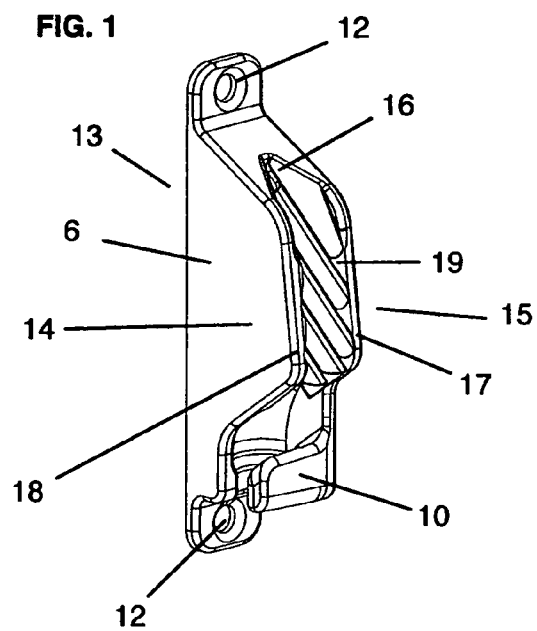
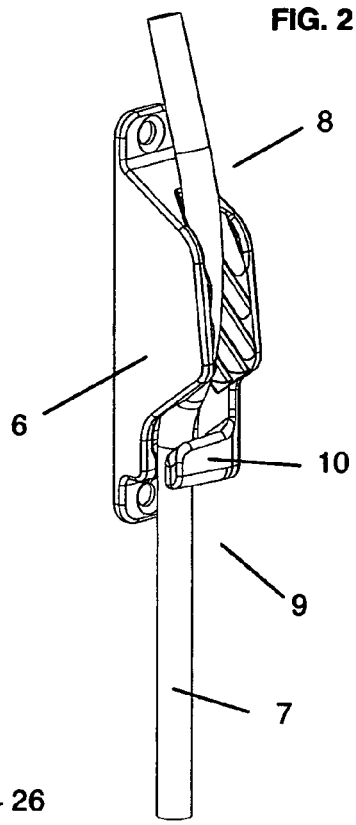
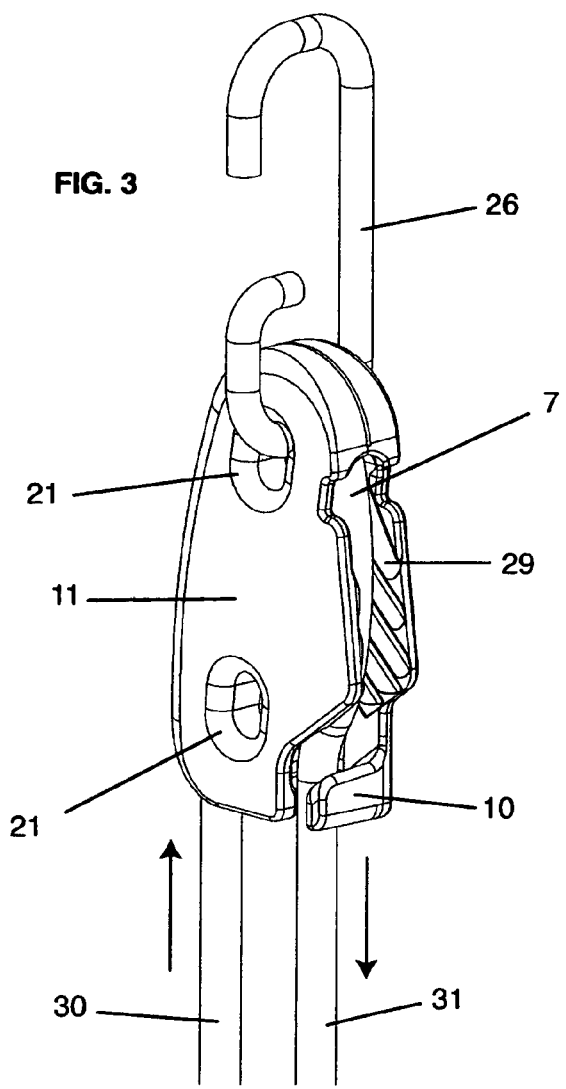

FIG. 8
FIG. 9
FIG. 10
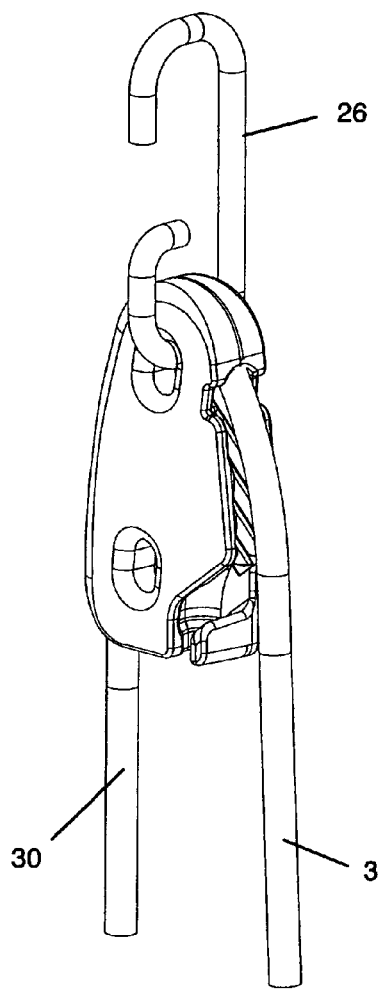
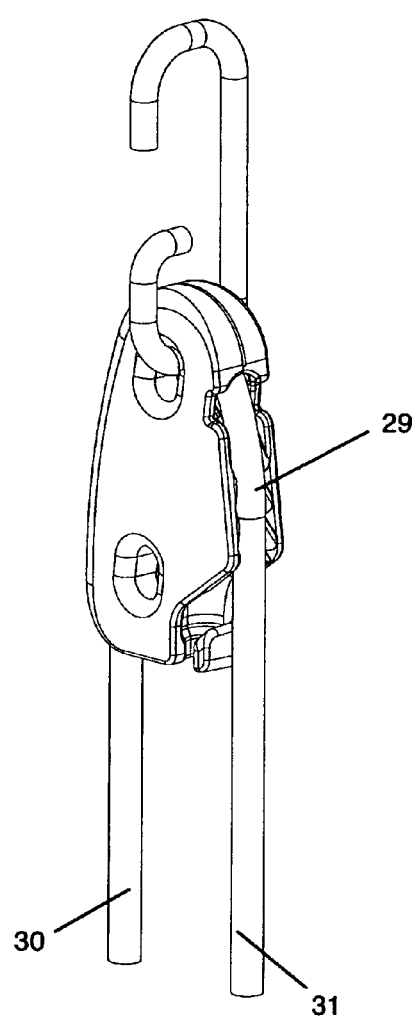
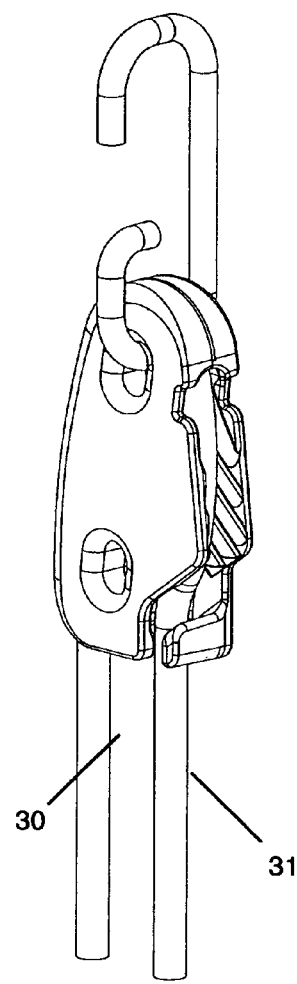

ated Nov. 8, 2004.

TIE DOWN TENSIONING DEVICE

This application claims priority to U.S. Provisional Application No. 60/627,428 filed Nov. 8, 2004.

FIELD

This invention relates to the tensioning of lines, ropes, webbing, elastic cables, and other flexible elongated elements used to tie down cargo, hoisting, and other similar applications.

BACKGROUND

This invention relates to a simple and inexpensive device for enabling the tie down of lines, ropes or elastic cables to be quickly and easily attached, tensioned, and reliably fixed in place under tension, while also enabling them to be quickly and easily released. It also relates to a tie down device that maintains tension of the load even upon a sudden and unexpected potential failure of the primary tie down device.

A variety of devices for tie-down tensioning are known in the art. However, such devices have been subject to one or more disadvantages in use. For example, some of the devices of the prior art have made it difficult to adjust the length of the tie-down to size prior to tensioning. This is especially true for those devices incorporating complex and inconvenient ratcheting or cam mechanisms. Most other devices are complicated and expensive to manufacture. Others incorporate sheaves, pins, springs, ratchets, cams, and other small parts that will wear out, potentially fail suddenly and without warning, and not work properly in harsh, muddy, wet, and extremely cold environments.

Furthermore, until now most prior art devices have required the user to engage a special unlocking feature at the device to release the rope tension. Unavoidably, this positions the user in close proximity to the load and provides no easy way to put distance between the user and the potentially harmful affects of releasing the tension.

Other more pressing problems with the prior art relate to potential unintended and catastrophic sudden failure due to inherent design flaws. For example, in most prior art devices the hook is connected to the main tensioning device with some form of rope or strapping. In other devices the hook is fastened directly to the housing. In all these example, should the housing or mechanism in the housing fail, the load tension will release. Furthermore, there is no back up method for maintaining the tension in such an event.

SUMMARY

It is the primary object of this invention to provide a simple and inexpensive device for a reliable tie down tensioning which device enables the tie-down to be quickly and easily applied and the flexible element tensioned and just as quickly and easily removed. It is also the object of this invention to provide a safer tie down than prior art. One further object of this invention is to provide a locking feature for jamming cleats and tie downs. Still another object of this invention is to provide a device that may be effectively used in conjunction with a reinforcement knot.

DRAWINGS

FIG. 1 is a perspective view of one embodiment of a jamming cleat of this invention;

FIG. 2 is a perspective view of a jamming cleat and rope;

FIG. 3 is a perspective view showing another embodiment consistent with this invention;

FIG. 8 is a perspective view of FIG. 3 with a rope not engaged in the jamming cleat;

FIG. 9 is a perspective view of FIG. 3 with a rope jammed in the cleat;

FIG. 10 is a perspective view of FIG. 3 with a rope jammed in the cleat and engaged in the locking feature;

DETAILED DESCRIPTION

Figure 4:
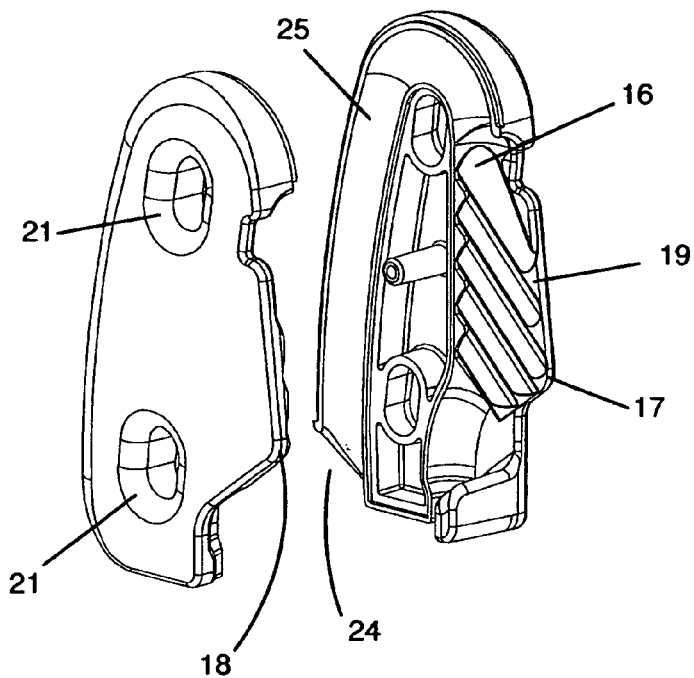
FIG. 4 is a perspective view of the device of FIG. 2 with the rope and hook removed, and both halves separated.

FIG. 1 shows a typical jamming cleat with a locking feature 10 consistent with this invention. In this example, the locking feature 10 is integral to the body 6 of the jamming cleat. In FIG. 2, the flexible elongated member, hereinafter simply called a rope 7, is shown fully engaged by the jamming cleat and locking feature 10. The input or distal end of the jamming cleat is 8, and the output or proximal end of the jamming cleat is 9. In this embodiment of the locking feature, the rope 7 slides under the locking feature through an opening sized to provide some amount of friction. In order to release the tension on the rope the operator will first have to release the rope from the locking feature. The locking feature could just as easily employ some other form of device that locks the rope without friction, like a device that interlaces the rope through a series of one or more features. The locking feature 10 for the rope is shown in all drawings as integral to the body or housing of the present invention, but need not be. Furthermore, in most instances the locking feature will be of sufficient strength to allow the rope to be further tensioned while remaining engaged within the locking feature. Obvious modifications may be made to the locking feature, as shown in the drawings, without departing from the teaching of this invention.

Figure 7:
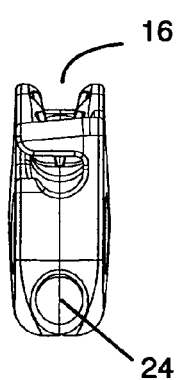
FIG. 7 is a rear view of the device of FIG. 3 with the rope removed.
Figure 11:
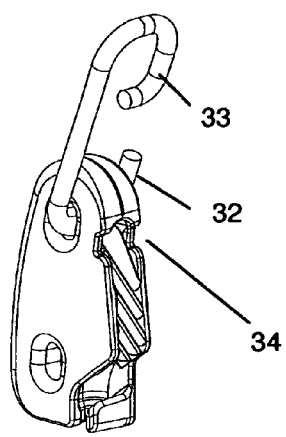
FIG. 11 is a perspective view of FIG. 3 with the hook ready for final fitting into the housing.
Figure 12:
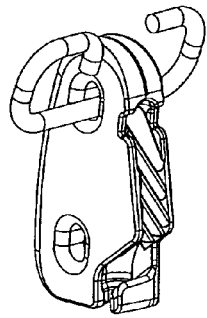
FIG. 12 is a perspective view of FIG. 3 showing the hook partially fitted into the housing.
Figure 13:
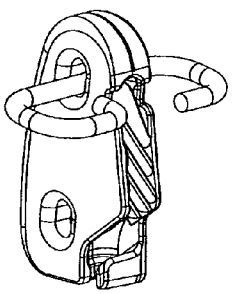
FIG. 13 is a perspective view of FIG. 3 showing the hook partially fitted into the housing.
Figure 14:
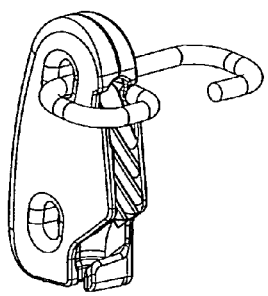
FIG. 14 is a perspective view of FIG. 3 showing the hook partially fitted into the housing.

FIG. 1 shows two apertures 12 used for mounting the cleat to another apparatus. The number of apertures, and the specific configuration will vary depending on the application. In this figure the base 13 of the jamming cleat may be flat, as shown, or of any other reasonable shape as dictated by the actual application. For example, the base could be round or curved in order to fit a round or curved apparatus. The base 13 of the jamming cleat may be elongate, as shown, and have two stationary side walls extend up from the base along the longer sides of the base. The side walls 14 and 15 define a groove 16 which is generally V-shaped in cross-section. One can more readily see the groove 16 in FIGS. 5 and 7. Referring back to FIG. 1, each side surface 17 and 18 is formed with a plurality of generally similar ridges 19. The ridges are generally rectilinear and parallel and are inclined towards the output end of the jamming cleat. Some of these elements are more easily seen in FIG. 4. It is important to note that a jamming cleat's body or housing may be of any number of shapes and sizes, depending on the diameter of the rope and the particular application.

As FIG. 3 shows, a jamming cleat housing may have apertures 21 that go completely through the sides of the cleat housing 11, and in planes opposite as those 12 found in FIGS. 1 and 2. In some applications these apertures will perform the same general purpose as the apertures 12 shown in FIGS. 1 and 2. For example, these said apertures may be used for mounting the cleat to another apparatus. These apertures 21 may also be used for lashing the cleat to another apparatus using a flexible element, such as strapping, rope, cable, or lines. Other uses for these apertures 21 will be elaborated upon below.

FIG. 3 also shows a rope tie down consistent with this invention. In this figure the rope has already been drawn into and through the housing 11, engaged the jamming cleat area 29, and has exited though the locking feature 10, and past the output end of the device. The arrows denote the direction the rope moves in order to increase tension. The load end of the rope 30 is generally attached to a load, and the tail end of the rope 31 is generally manipulated by the operator to increase or release tension. In FIG. 3 the distal aperture 21 is fitted with a hook 26. It is important to note that the rope wraps around both apertures, which include the hook. Therefore, a reinforcement knot tied between the load end and tail end of the rope will naturally secure the rope to the hook, irrespective of the tie down device. This is vitally important should the tie down device suffer a catastrophic failure. Should this occur, the rope will still remain in tension, as long as the reinforcement knot and hook are not compromised, as well.

Figure 5:
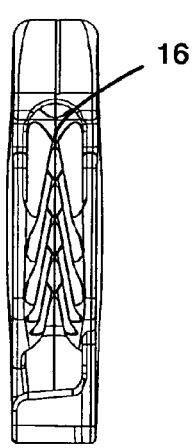
FIG. 5 is a top view of FIG. 3 with the rope and hook removed.

To better illustrate the path of the rope through the device we refer to FIG. 4. Here, the rope first passes through the ingress hole 24, then through a channel 25 in the housing, wrapping around both proximal and distal apertures 21, and then continuing past the gripping ridges of the jamming cleat 19, into the locking feature 10, and finally exiting past the output end of the device. The channel 25 is generally parallel to the base of the jamming cleat feature before turning approximately 180 degrees, at which point the rope is directed into the jamming cleat's groove 16. Some portion of the channel 25 is necessary to prevent the rope from moving away from the housing when under load. In this figure the channel 25 is shown as one continuous and enclosed path. The channel could be partially open and non continuous. Obvious modifications may be made to channel 25, as shown in the drawings, without departing from the teaching of this invention.

Referring back to FIG. 3, here we see a hook 26 fitted to the distal aperture 21. These hooks can be of many different shapes, lengths, and sizes, depending on the particular application. Furthermore, these apertures 21 may be fitted with mounting hardware or other flexible elongated elements instead of hooks 26. There are many instances where use of a metal hook or fastener will cause a marring or scratching of a surface. For example, when securing a load to a car or truck body one must often take precaution to prevent the tie down hook from scratching the paint. In these instances it may be more advantageous to remove the hook and use a rope or other flexible element. These apertures may also be fitted with bolts or other fasteners, again, depending on the actual use of the tie down.

Figure 6:
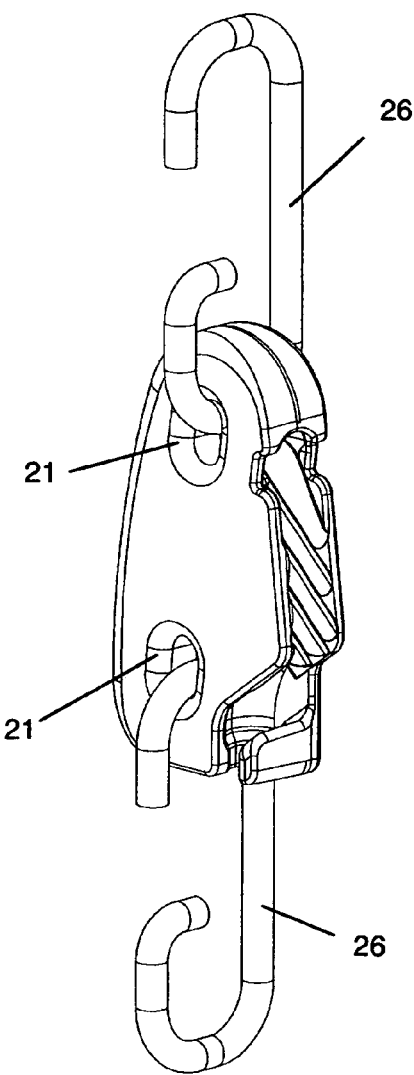
FIG. 6 is a perspective view of the device of FIG. 3 with the rope removed and a hook in each aperture.

FIG. 6 shows both apertures 21 fitted with hooks 26. This is to illustrate that a hook from either the load side of the same device, or any other hook from any other place, can be easily attached to the body of the device. When used as a tie down, it is sometimes useful to wrap the load end of the tie down around your load, and then return the load hook to the tie down device. This application is useful for many reasons, one of which is to take up slack quickly. Another reason is when using the tie down in a block and tackle application, wherein the load line is returned to the housing of the tie down, and the load line incorporates some form of a pulley or sheave that connects in some way to the actual load. The proximal aperture 21 provides a highly convenient location upon which to secure the load hook or load end of rope. It should be noted that the load hook may be removed all together, and the end of the load rope simply secured to this aperture with a knot.

FIGS. 8 through 10 show a typical tightening sequence of the tie down. In FIG. 8 the tail end 31 of the rope is pulled on the out feed end in the direction of the arrow until a desired tension is achieved. Next, in FIG. 9, the rope is moved by the operator into contact with the jamming cleat feature 29. The operator then releases the tension on the tail line 31 until the jamming cleat feature 29 grips the line. At this moment, the rope will be gripped by the jamming cleat and be held stationary until the operator moves the rope to increase or release the tension. It should be noted that in this position the tension could be easily readjusted by pulling on the tail line 31, or immediately released by pulling the tail line 31 away from the jamming cleat feature 29. Put simply, this tie down device has the ability to instantly lock and release. It should also be stressed that having the ability to immediately lock and release the tension in a tie down device is a potentially life saving feature.

Returning back to the tightening sequence, in FIG. 10 the operator has now moved the tail line 31 under the locking feature 10. In this final position, the rope is far less likely to be unintentionally released from the device unless the operator purposely moves the rope away from the locking feature. The locking feature 10 is sufficiently strong to readjust the tension of the rope while the rope is located in this position. The locking feature creates a blockage arm 10 for the rope that prevents the rope from lifting out of the jamming cleat area. The locking feature may employ any number of ways to keep the rope under the blockage arm. Two of the many examples could include friction or other shapes in the housing designed to contain the rope. The locking feature may also employ some form of a friction fit to prevent the rope from being easily released from the locking feature. It should be noted that a friction fit is just one of the many methods one can use with the locking feature to prevent the flexible element from unintentional release.

FIGS. 11 through 15 is a sequence of drawings that show how the novel hook locking feature works. In this embodiment of the hook locking feature the housing 11 and hook 26 both have a special and complimentary shape. The hook locking feature prevents the hook 26 from easily separating from the tie down housing 11, especially when the rope is not in tension. Before explaining any further, one should note that the hook 26 shown has two distinct ends. One end 32 is designed for attaching the hook to a load or secure point The other end of the hook 33 is designed for meshing with the hook locking feature designed into the tie down housing 34. A particular sequence is generally followed which begins by installing the hook 26, as shown in FIGS. 11 through 14, beginning with the insertion of the load end 32 of the hook 26 into the housing 11, as shown. The complimentary relationship between the shape of the hook's housing end 33, and the housing 34, allow the hook to be fitted into the tie down housing 11. The hook and housing may share complimentary shapes, as shown. The housing or hook may also have the only particular shape necessary to provide the securing of the hook to the housing.

Figure 15:
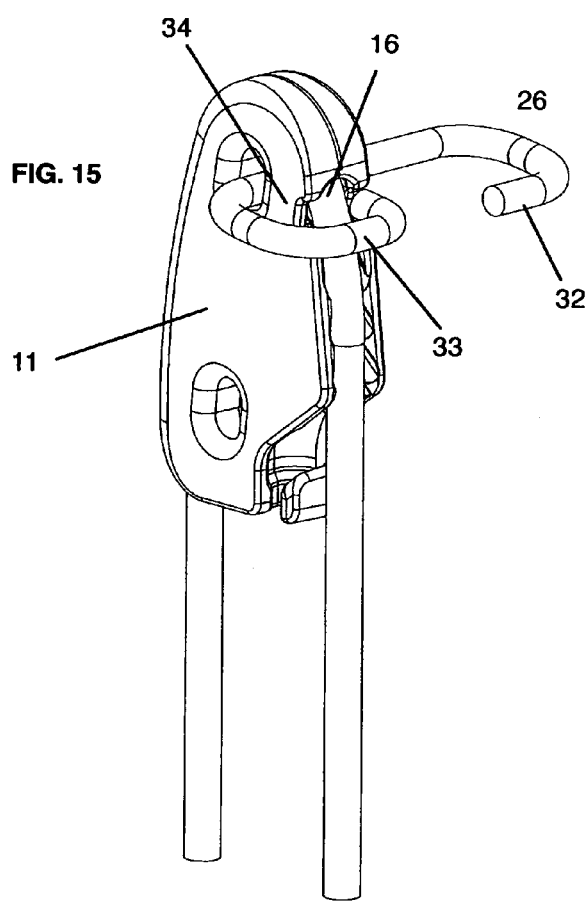
FIG. 15 is a perspective view of FIG. 3 showing the hook fully fitted into the housing.

The final step for securing the hook to the housing is accomplished by feeding the rope into the housing. As FIG. 15 shows, with the addition of the rope in the cleat's groove 16, the exit path for the housing end of the hook 33 will be partially blocked by the rope, thereby securing it to the housing. The installation of the rope has created a barrier that prevents the housing end 33 of the hook 26 from separating from the housing in the reverse order from which it was installed. Alternatively, the hook may simply be fitted with some form of a binder or other locking feature on the hook, or the housing, that accomplishes the same result.

What is claimed is:

1. A tie down tensioning device for holding a flexible elongated element under tension comprising:
   a housing comprising first and second opposed side walls;
   a groove extending between an input and an output for receiving a flexible elongated element, said groove being defined between the opposed side walls and having two opposed interior side surfaces extending from a base that runs in a substantially axial direction, each side surface being provided with a plurality of ridges for gripping such a flexible elongated element received in the groove, said ridges being inclined from near the base away from the base along the side surfaces towards the output of the groove;
   at least one aperture defined through the first and second opposed sidewalls roughly perpendicularly to the axial direction and configured to receive a securing element and substantially isolate the securing element from the flexible elongated element during a tie down operation in which (i) the securing element is secured to at least one substantially fixed object, (ii) a load end of the flexible elongated element engages a load and is secured to at least one substantially fixed object, and (iii) the load end of the flexible elongated element is tensioned; and
   a locking feature to prevent the flexible elongated element from lifting out of the ridges during the tie down operation, wherein the locking feature is located near the output end of the groove and is adapted to permit a decrease in tension in the load end of the flexible elongated element only after the flexible elongated element is disengaged from the locking feature.

2. The tie down tensioning device of claim 1, wherein the housing defines a channel having an opening for ingress of the flexible elongated element, and wherein the channel is configured to guide the received flexible elongated element around the at least one aperture defined through the first and second opposed side walls around which the channel is defined, a portion of the housing located between the channel and the at least one aperture being in compression during the tie down operation, thereby permitting the flexible elongated element to engage the securing element and prevent significant tension loss if the housing suffers a catastrophic failure.

3. The tie down tensioning device of claim 2, wherein at least a portion of the channel is parallel to the elongated base.

4. The tie down tensioning device of claim 1, wherein the groove is V-shaped in transverse cross-section.

5. The tie down tensioning device of claim 1, wherein the housing defines two or more apertures defined through the first and second opposed sidewalls, each of the at least two apertures configured to receive a securing element.

6. The tie down tensioning device of claim 5, wherein the tie down tensioning device is part of a block and tackle configuration, with the flexible elongated element being coupled to a second aperture.

7. The tie down tensioning device of claim 1, wherein the locking feature comprises a single blockage arm extending from one of the first and second opposed sidewalls under which the flexible elongated element is received so as to prevent the flexible elongated element from lifting out of the groove.

8. The tie down tensioning device of claim 1, wherein the securing element is a removable hook comprising a first end for attachment to a securing point and a second end having a projection, wherein the housing comprises a notch that is complementary with the projection of the removable hook, the hook being insertable into and removable from the housing only when the projection is aligned with the notch.

9. A tie down tensioning device comprising:
   a housing comprising first and second opposed sidewalls defining a jamming cleat feature, the jamming cleat feature having two opposed interior side surfaces extending from an elongated base that runs in a substantially axial direction between an input and an output, said housing having an opening for ingress of a flexible elongated element into said housing and through a channel, the channel along at least a portion of its length completely surrounding at least a portion of the length of the flexible elongated element received therein, the channel is configured to guide the flexible elongated element into the input of the jamming cleat feature, each side surface of the jamming cleat feature being provided with a plurality of ridges for gripping the flexible elongated element, the ridges being inclined from near the elongated base away from the elongated base along the side surfaces toward the output of the jamming cleat feature;
   at least one hole defined through the first and second opposed side walls roughly perpendicularly to the axial direction around which the channel wraps for mounting of a securing element during a tie down operation in which (i) the securing element is secured to at least one substantially fixed object, (ii) a load end of the flexible elongated element engages a load and is secured to at least one substantially fixed object, and (iii) the load end of the flexible elongated element is tensioned; and
   a locking feature proximate the output of the jamming cleat feature to prevent the flexible elongated element from lifting out of the jamming cleat feature during the tie down operation, the locking feature being adapted to permit an increase in tension while the locking feature is engaging the flexible elongated element but adapted to permit a decrease in tension in the flexible elongated element only after the flexible elongated element is disengaged from the locking feature.

10. The tie down tensioning device of claim 9, wherein the flexible elongated element wraps around the at least one hole when received in the channel, a portion of the housing located between the channel and the at least one hole being in compression during the tie down operation, thereby permitting the flexible elongated element to engage the securing element and prevent significant tension loss if the housing suffers a catastrophic failure.

11. The tie down tensioning device of claim 9, wherein the securing element is a removable hook comprising a first end for attachment to a securing point and a second end having a projection, wherein the housing comprises a notch that is complementary with the projection of the removable hook, the hook being insertable into and removable from the housing only when the projection is aligned with the notch.

12. The tie down tensioning device of claim 9, wherein at least two holes are defined through the first and second opposed sidewalls, each of the at least two holes configured to receive a securing element.

13. The tie down tensioning device of claim 12, wherein the tie down tensioning device is part of a block and tackle configuration, with the flexible elongated element being coupled to a second hole.

14. The tie down tensioning device of claim 9, wherein the channel for receiving the flexible elongated element is enclosed for the channel's entire length.

15. The tie down tensioning device of claim 9, wherein the channel for receiving the flexible elongated element is U-shaped.

16. The tie down tensioning device of claim 9, wherein the housing is made from plastic or metal material.

17. The tie down tensioning device of claim 9, wherein the housing is made from two or more pieces, wherein at least one of the two or more pieces comprises the first sidewall and another of the two or more pieces comprises the second sidewall, and further wherein the two or more pieces are fastened together.

18. The tie down tensioning device of claim 9, wherein at least a portion of the channel is parallel to the elongated base.

19. The tie down tensioning device of claim 9, wherein the locking feature comprises a single blockage arm extending from one of the first and second opposed sidewalls under which the flexible elongated element is received so as to prevent the flexible elongated element from lifting out of the jamming cleat feature.

20. A tie down tensioning device comprising:
a housing comprising first and second opposed sidewalls defining a jamming cleat feature having two opposed interior side surfaces extending from a base that runs in a substantially axial direction between an input and an output, said housing having an opening for ingress of a flexible elongated element into said housing and through a channel, the channel along at least a portion of its length completely surrounding at least a portion of the length of the flexible elongated element received therein, the channel is configured to guide the flexible elongated element into the jamming cleat feature before passing through the output end of said housing, each side surface of the jamming cleat feature being provided with a plurality of ridges for gripping the flexible elongated element, the ridges being inclined from near the elongated base away from the elongated base along the side surfaces toward the output of the jamming cleat feature;
a first aperture defined through the first and second opposed sidewalls roughly perpendicularly to the axial direction around which the channel wraps for mounting of a securing element and for substantially isolating the securing element from the flexible elongated element during a tie down operation in which (i) the securing element is secured to at least one substantially fixed object, (ii) a load end of the flexible elongated element engages a load and is secured to at least one substantially fixed object, and (iii) the load end of the flexible elongated element is tensioned; and
at least a second aperture defined through the first and second opposed sidewalls for mounting of another securing element.

21. The tie down tensioning device of claim 20, wherein the flexible elongated element wraps around the at least one aperture when received in the channel, a portion of the housing located between the channel and the at least one aperture being in compression during the tie down operation, thereby permitting the flexible elongated element to engage the securing element and prevent significant tension loss if the housing suffers a catastrophic failure.

22. The tie down tensioning device of claim 20, wherein the securing element is a removable hook comprising a first end for attachment to a securing point and a second end having a projection, wherein the housing comprises a notch that is complementary with the projection of the removable hook, the hook being insertable into and removable from the housing only when the projection is aligned with the notch.

23. The tie down tensioning device of claim 20, wherein the tie down tensioning device is part of a block and tackle configuration, with the flexible elongated element being coupled to the second aperture.

24. The tie down tensioning device of claim 20, wherein the channel for receiving the flexible elongated element is enclosed for the channel's entire length.

25. The tie down tensioning device of claim 20, wherein the channel for receiving the flexible elongated element is U-shaped.

26. The tie down tensioning device of claim 20, wherein the housing is made from plastic or metal material.

27. The tie down tensioning device of claim 20, wherein the housing is made from two or more pieces, wherein at least one of the two or more pieces comprises the first sidewall and another of the two or more pieces comprises the second sidewall, and further wherein the two or more pieces are fastened together.

28. The tie down tensioning device of claim 20, wherein at least a portion of the channel is parallel to the elongated base.

29. The tie down tensioning device of claim 20, wherein the locking feature comprises a single blockage arm extending from one of the first and second opposed sidewalls under which the flexible elongated element is received so as to prevent the flexible elongated element from lifting out of the jamming cleat feature.

30. The tie down tensioning device of claim 20, further comprising a locking feature proximate the output end of the jamming cleat feature to prevent the flexible elongated element from lifting out of the jamming cleat feature during a tie down operation, the locking feature being adapted to permit a decrease in tension in the flexible elongated element only after the flexible elongated element is disengaged from the locking feature.

31. The tie down tensioning device of claim 30, wherein the locking feature is further adapted to permit an increase in tension while the locking feature is engaging the flexible elongated element.

* * * * *